F. M. NORTON & B. C. H. SIMPSON.
DRAFT APPLIANCE.
APPLICATION FILED JULY 18, 1911.
1,043,347.
Patented Nov. 5, 1912.
Fig. 1.
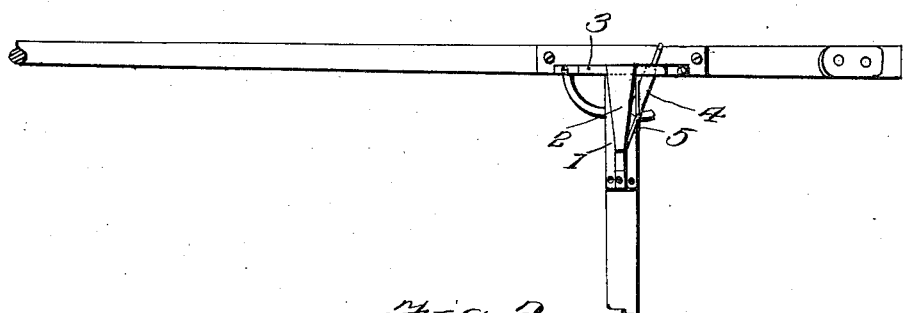
Fig. 2.
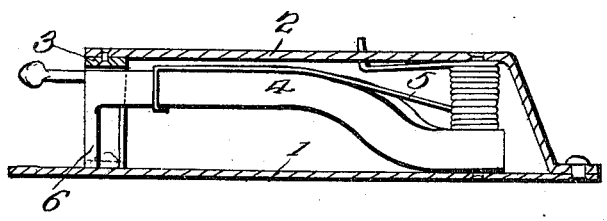
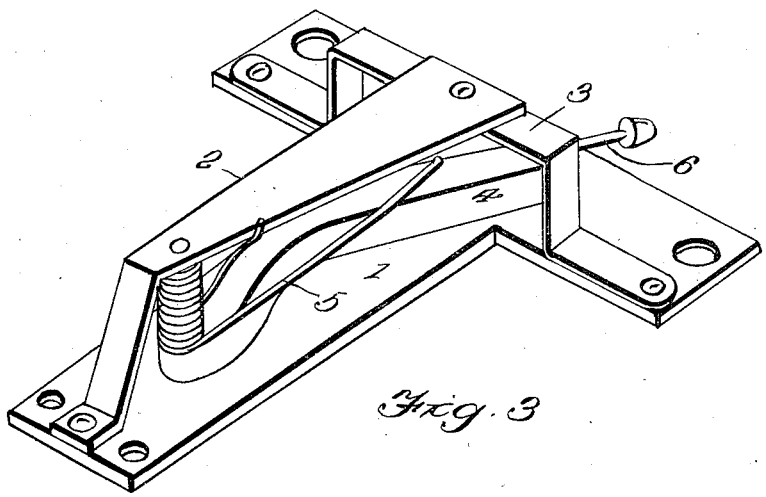
Fig. 3.
Witnesses
Inventors
F. M. Norton.
B. C. H. Simpson.
By
Attorneys.

UNITED STATES PATENT OFFICE.

FRANCIS M. NORTON AND BURWELL C. H. SIMPSON, OF KNOXVILLE, KENTUCKY.

DRAFT APPLIANCE.

1,043,347.  Specification of Letters Patent.  Patented Nov. 5, 1912.

Application filed July 18, 1911. Serial No. 639,221.

*To all whom it may concern:*

Be it known that we, FRANCIS M. NORTON and BURWELL C. H. SIMPSON, citizens of the United States, residing at Knoxville, in the county of Pendleton and State of Kentucky, have invented certain new and useful Improvements in Draft Appliances, of which the following is a specification.

This invention relates to draft appliances, and has for its object to provide a simple and durable device adapted to be applied to the shafts and cross bar of a buggy or similar vehicle and which is provided with spring held members of peculiar configuration with which the ends of the traces are adapted to be connected. By making such provision, the vehicle and its occupant are not subjected to sudden jolts or jarring in case the draft animal makes sudden starts or movements.

In the accompanying drawing:—Figure 1 is a top plan view of the appliance applied; Fig. 2 is an enlarged longitudinal sectional view of the appliance; and Fig. 3 is a perspective view of the appliance.

Corresponding and like parts are referred to in the following description and indicated in all the views of the accompanying drawing by the same reference characters.

As hereinbefore stated and as shown in the drawing, the appliance is adapted to be positioned upon the shaft or cross bar of a vehicle, and it consists of a base plate 1 which is approximately T-shaped in plan. The branches of the said plate are adapted to be secured to the side of the shaft, while the stem thereof is adapted to be secured to the cross bar between the shafts. A frame 2 is mounted upon the plate 1 and is provided with a loop portion 3 which extends transversely of the stem of the base plate 1. A bar 4 is pivoted to the frame 2 and has an end portion that projects through the loop portion 3 of the said frame. A spring 5 is coiled about the pivot of the bar 4 and at one end bears against the frame 2 and at the other end bears against the bar 4, and is under tension with a tendency to hold the free end portion of the said bar against one of the ends of the loop portion 3 of the frame 2. The bar 4 is provided at its free end portion with a lug 6 which extends down in close proximity to the upper surface of the base plate 1.

When a trace is applied to the free end of the bar 4, the spring 5 normally holds the free end portion of the bar 4 against the rear side of the loop portion 3 of the frame 2. If, however, the draft animal should make a sudden start, the spring 5 will give and the free end portion of the bar 4 will swing toward the forward end of the loop portion 3 of the said frame. This movement on the part of the said bar will absorb the shock and relieve the vehicle and its occupant of sudden jars or jolting. Continued forward pull on the trace which is connected with the bar 4 will bring the free end portion of the said bar in contact with the forward edge of the loop portion 3 of the frame 2, when the forward movement of the said bar 4 is checked and the vehicle will be positively moved in a forward direction with the trace. As soon as any slack occurs in the trace the tension of the spring 5 comes into play and swings the free end portion of the bar 4 rearwardly to its normal position.

By equipping the shafts of a buggy with the appliances, as hereinbefore described, the usual swingle-tree may be dispensed with and at the same time the said appliances will have sufficient give to relieve the shoulders of the animal while it is traveling, and also serve to relieve the vehicle and harness of sudden strains incident to sudden starts or movements on the part of the animal.

Having thus described the invention, what is claimed as new is:

A draft appliance comprising a T shaped base plate, a T shaped frame mounted upon the plate and secured at its ends to the ends of the plate and having its intermediate portion spaced from the plate, a pivot pin secured between the base plate and the intermediate spaced portion of the frame, a bar pivotally mounted upon said pin and bearing at its inner end directly upon the upper surface of the plate and extending through the outer portion of the frame in close proximity with the under side thereof, said bar at its outer end having a depending lug which bears upon the upper surface of the plate, and a spring coiled about the pivot pin and bearing at one end against the frame and at its other end against the bar.

In testimony whereof, we affix our signatures in presence of two witnesses.

FRANCIS M. NORTON. [L. s.]
BURWELL C. H. SIMPSON. [L. s.]

Witnesses:
J. L. MASSEY,
ASHLAND SIMPSON.

Copies of this patent may be obtained for five cents each, by addressing the "Commissioner of Patents, Washington, D. C."